United States Patent [19]

Nebel et al.

[11] Patent Number: 5,230,384

[45] Date of Patent: * Jul. 27, 1993

[54] HORSESHOE ASSEMBLY HAVING GLIDE CLIPS AND METAL STUDS

[76] Inventors: David J. Nebel, 16816 Clay Hill Rd., Dubuque, Iowa 52011; Keith L. Hansen, 1800 N. Federal, Hampton, Iowa 50441

[*] Notice: The portion of the term of this patent subsequent to Dec. 8, 2009 has been disclaimed.

[21] Appl. No.: 864,035

[22] Filed: Apr. 6, 1992

Related U.S. Application Data

[63] Continuation-in-part of Ser. No. 664,813, Mar. 5, 1991, Pat. No. 5,168,934.

[51] Int. Cl.⁵ .................. A01L 1/00; A01L 5/00; A01L 7/06
[52] U.S. Cl. .................. 168/11; 168/13; 168/29; 168/34
[58] Field of Search .................. 168/4, 11, 12, 13, 29, 168/34, 42, DIG. 1

[56] References Cited

U.S. PATENT DOCUMENTS

| | | | |
|---|---|---|---|
| 703,123 | 6/1902 | Dillon | 168/11 |
| 2,064,531 | 12/1936 | Genecand | 168/34 |
| 3,782,473 | 1/1974 | Spencer | 168/4 |
| 4,235,292 | 11/1980 | Dallmer | 168/DIG. 1 X |
| 4,736,800 | 4/1988 | Rohner | 54/82 X |

Primary Examiner—Robert P. Swiatek
Attorney, Agent, or Firm—Zarley, McKee, Thomte, Voorhees & Sease

[57] ABSTRACT

The horseshoe assembly of the present invention comprises a U-shaped pad member having one or more glide clips attached thereto around its outer circumference. Each of the glide clips has a glide surface protruding a short distance below the bottom surface of the pad member. The coefficient of friction of the glide members is less than that of the pad member. At least one elongated stud is fitted within a stud receiving hole in the bottom surface of the pad member and includes a lower stud end protruding below the bottom surface of the pad member.

16 Claims, 3 Drawing Sheets

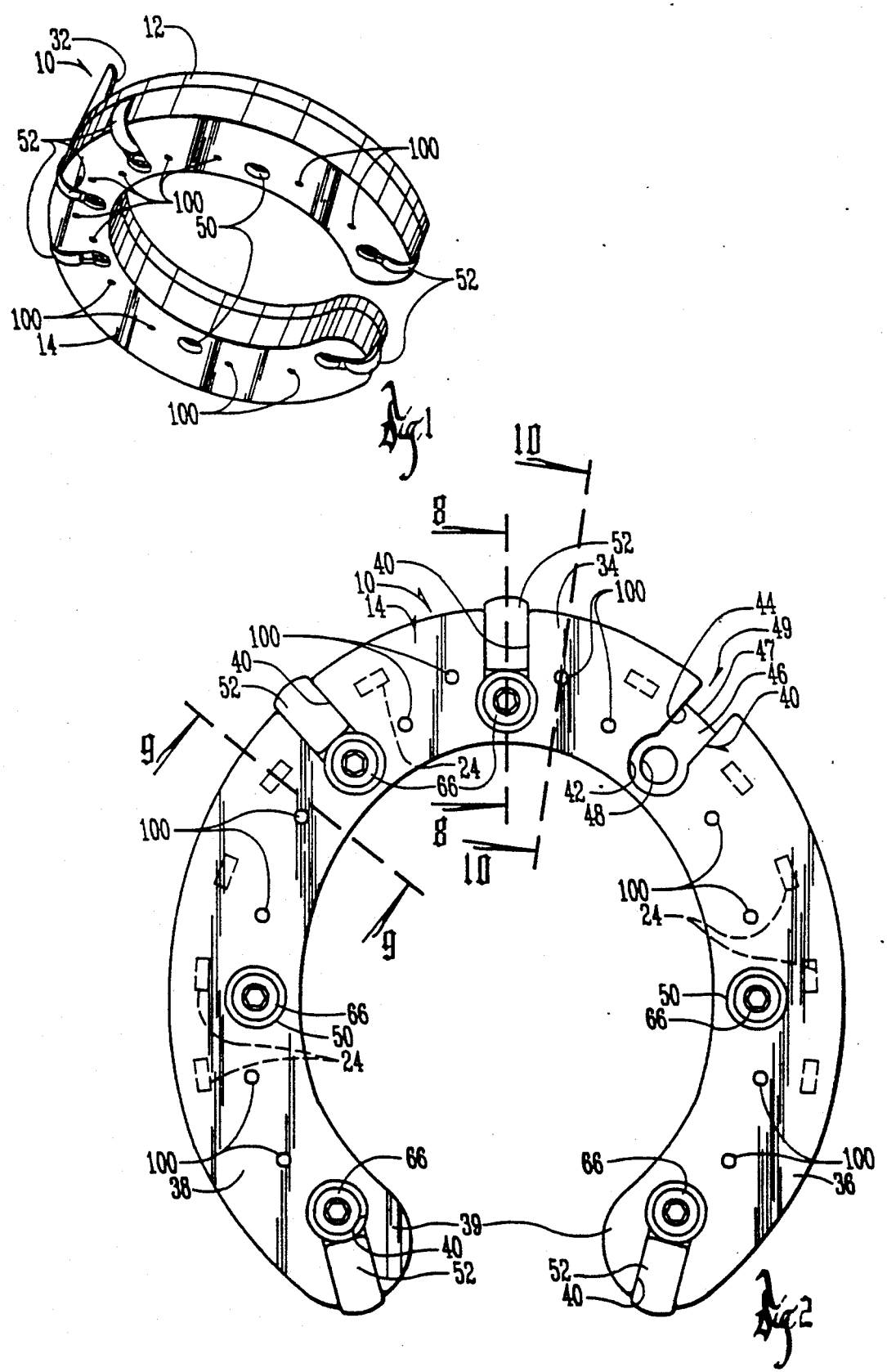

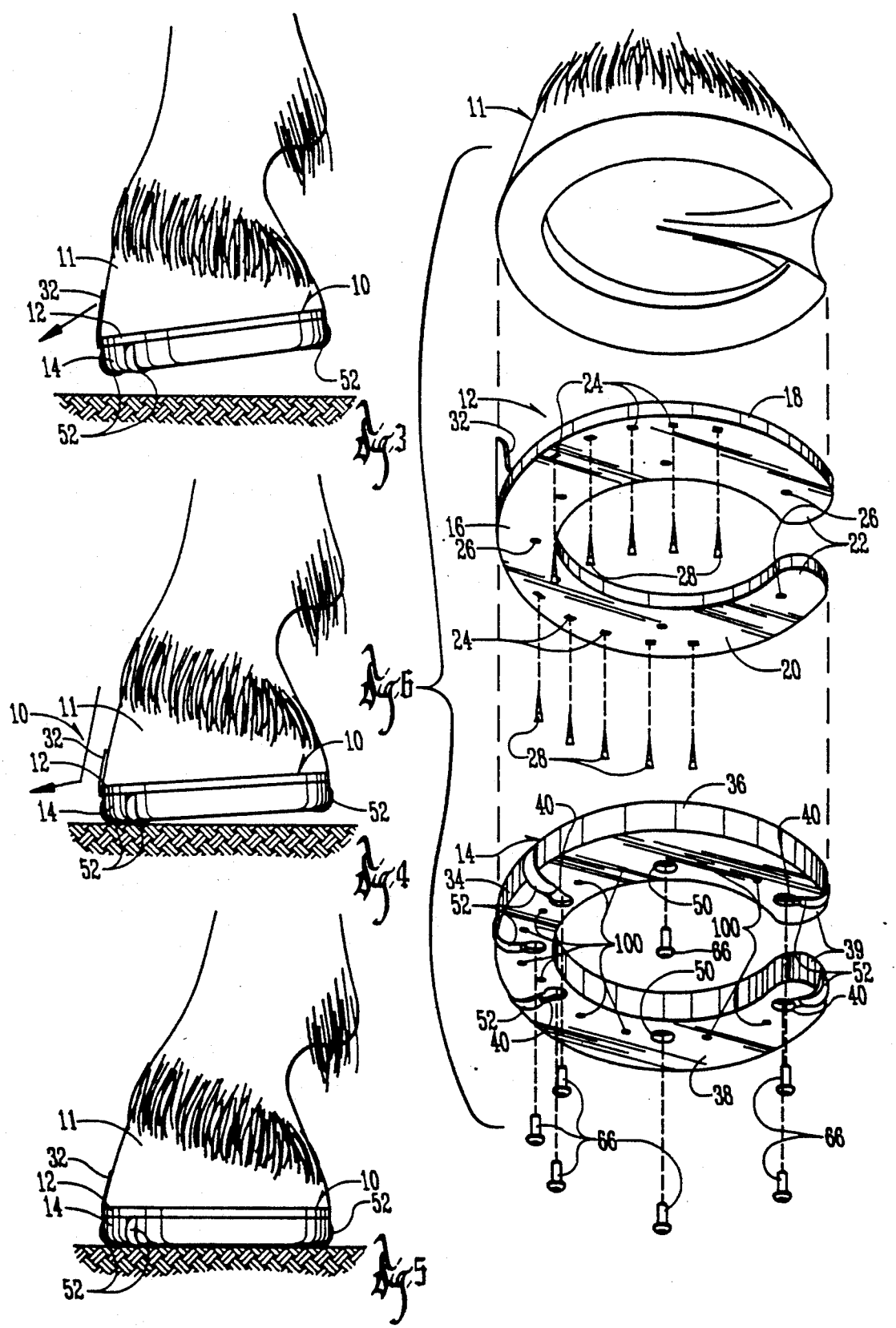

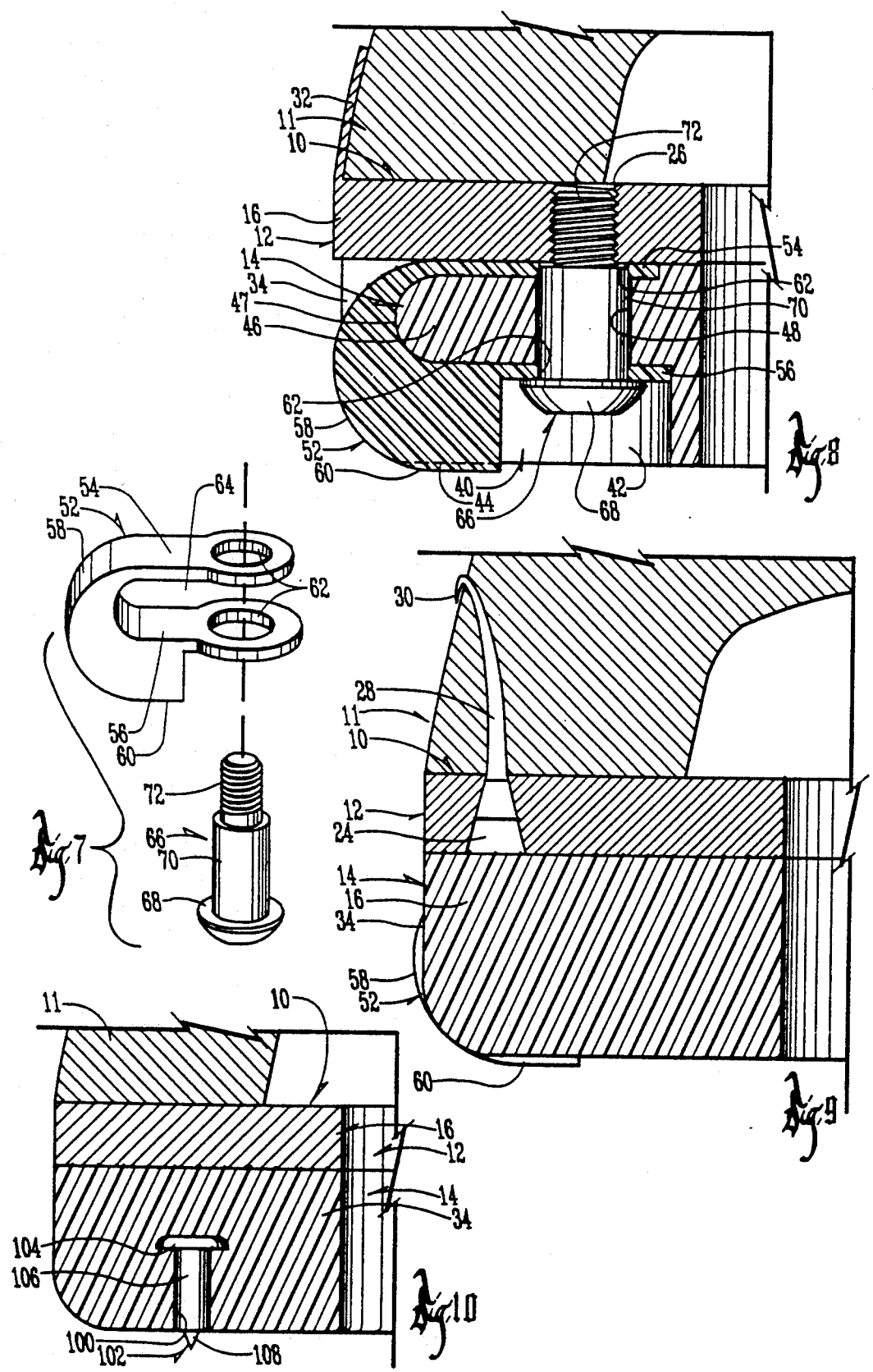

HORSESHOE ASSEMBLY HAVING GLIDE CLIPS AND METAL STUDS

This is a continuation-in-part of copending application Ser. No. 07/664,813, filed Mar. 5, 1991, and now U.S. Pat. No. 5,168,934.

BACKGROUND OF THE INVENTION

The present invention relates to a horseshoe assembly having glide clips.

Horses are often presently exposed to hard paving surfaces, such as concrete, blacktop, or other paving surfaces. Examples of horses which are used on these types of surfaces include mounted police horses, horses for pulling carts, and horses which are used in parades or other situations where hard surfaces or paving is present.

Hard paving surfaces create several problems for horses using conventional metal shoes. The hard surfaces create damage to the lower joint of the horse's leg, and often the useful life of the horse is diminished as a result of extended exposure to hard paving surfaces. Another problem encountered with conventional horseshoes on hard surfaces is that the shoes slip, thereby creating a hazard both for the horse and the person riding the horse.

Attempts have been made to provide rubber shoes for horses which are exposed to hard-paved surfaces. However, several problems are encountered with these rubber shoes. Because of the high friction on the rubber shoe, the horse's gait is altered. The normal gait for a horse involves a gliding motion of the horse's foot as it engages the ground. On natural soils, this gliding motion takes place, and the horse's gait is natural. However, when rubber shoes are used, the high friction of the rubber shoe prevents the horse's hoof from gliding forward as it initially engages the paving. This shortens the horse's gait from what it normally would be.

Another problem encountered with rubber shoes is that they are very difficult to keep on the horse. Conventional nails or screws do not provide a very secure attachment of the rubber shoe to the horse's hoof, and therefore, it is necessary to reattach the shoe much more often than is normally the case with metal shoes. Another problem encountered with rubber shoes is that they wear out quickly. There is also a need for enhancing the ability of a rubber horse shoe to mountain adequate traction on icy surfaces.

Therefore, a primary object of the present invention is the provision of an improved horseshoe assembly having glide clips thereon.

A further object of the present invention is the provision of an improved horseshoe assembly having a rubber pad provided with metal studs for gripping icy or slippery surfaces.

A further object of the present invention is the provision of a horseshoe assembly having a metal plate attached to the horse's hoof, and having a rubber pad attached securely to the metal plate.

A further object of the present invention is the provision of an improved horseshoe assembly which utilizes a rubber pad, but which also utilizes glide clips having a lower coefficient of friction than the rubber pad.

A further object of the present invention is the provision of an improved horseshoe assembly using a rubber pad, but permitting the horse's hoof to glide a short distance over the supporting surface as it engages the supporting surface.

A further object of the present invention is the provision of an improved horseshoe assembly utilizing a rubber pad which does not shorten the horse's gait as is often the case with present rubber pads being used.

A further object of the present invention is the provision of an improved horseshoe assembly which permits a slight gliding action of the rubber shoe when it engages the supporting surface, but which ultimately frictionally engages the supporting surface when the horse's full weight is placed thereon.

A further object of the present invention is the provision of an improved horseshoe assembly utilizing a rubber pad, and utilizing plastic clips which extend the life of the pad.

A further object of the present invention is the provision of an improved horseshoe assembly which is economical to manufacture, durable in use, and efficient in operation.

SUMMARY OF THE INVENTION

The present invention utilizes a metal plate which is attached to the bottom of a horse's hoof in a conventional fashion. The metal plate includes screw holes for permitting the attachment of a rubber shoe to the bottom surface thereof. The rubber shoe has a plurality of plastic clips around its periphery which protrude slightly downwardly below the bottom surface of the rubber shoe. The plastic clips have a lower coefficient of friction than the coefficient of friction of the rubber. When the horse's foot engages the supporting surface, the clips come into contact with the surface and permit a slight amount of gliding action as the horse's hoof begins to engage the surface. However, once the horse places its full weight on the hoof, the gliding clips are compressed so that the surface of the rubber engages the supporting surface or pavement on which the horse is resting. This causes the friction of the rubber to give the horse traction, thereby preventing slipping as is often the case with metal shoes.

The clips which are used on the horse's hoof are made of a durable plastic which has a lower coefficient of friction than rubber and which is less susceptible to wear from friction. This later feature causes the clips to extend the life of the shoe since the clips bear the initial friction between the shoe and the supporting surface.

The present invention also utilizes metal studs mounted within the rubber shoe for engaging icy or slippery surfaces to give additional traction between the rubber shoe and those surfaces.

BRIEF DESCRIPTION OF THE DRAWINGS

FIG. 1 is a perspective view of the horseshoe assembly of the present invention.

FIG. 2 is a bottom plan view of the assembly, showing one of the clips removed from the rubber pad.

FIGS. 3, 4, and 5 are illustrations of the movement of the horse's hoof as it engages the ground with the horseshoe assembly of the present invention mounted on the horse's hoof.

FIG. 6 is an exploded perspective view of the horseshoe assembly of the present invention.

FIG. 7 is an exploded perspective view of the clip which is attached to the rubber pad in horseshoe assembly of the present invention.

FIG. 8 is a sectional view taken along line 8—8 of FIG. 2, but showing the shoe mounted on the bottom of a horse's hoof.

FIG. 9 is a sectional view taken along line 9—9 of FIG. 2, but showing the shoe mounted on the bottom of a horse's hoof.

FIG. 10 is a sectional view taken along line 10—10 of FIG. 2.

DESCRIPTION OF THE PREFERRED EMBODIMENT

Referring to the drawings, the numeral 10 generally refers to the horseshoe assembly of the present invention. Assembly 10 is adapted for mounting on a horse's hoof 11 (FIG. 6) and includes a metal shoe plate 12 and a rubber shoe or pad 14. While pad 14 is preferably made out of rubber, it can also be made out of other elastomeric materials having a reasonably good coefficient of friction and also being capable of compressing slightly to cushion the shock between the horse's hoof and a hard supporting surface. Preferably, the compressibility of the rubber should produce a durometer reading of between 50 and 90.

Metal shoe plate 12 is conventionally shaped to fit the bottom of the horse's hoof 11. Plate 12 includes a forward web 16 and two trailing legs 18, 20, each of which terminate in a rearward end 22. Around the periphery of the metal plate 12 are a plurality of rectangular nail holes 24 for receiving conventional horseshoe nails 28 for securing the plate 12 to the bottom of the horse's hoof 11. Also located in spaced relation to one another around the inner circumference of the shoe are a plurality of threaded bolt holes 26 which are adapted to receive bolts for securing the pad 14 to the bottom of plate 12.

As can be seen in FIG. 9, the plate 12 is secured to the bottom of the horse's hoof 11 by means of nails 28, which are driven upwardly into the horse's hoof and which exit on the upper front surface of the horse's hoof. The ends 30 of the nails 28 are then bent over in conventional fashion. The front edge of the plate 12 includes a conventional toe tab 32 which abuts against the front surface of the horse's hoof 11.

Rubber pad 14 comprises a forward web 34 which interconnects two rearwardly-extending legs 36, 38, each of which terminate in a rearward end 39. A plurality of peripheral slots 40 are provided around the outer perimeter of the pad 14 and extend radially therein. Each peripheral slot includes a keyhole circle 42 (FIG. 2) having keyhole sidewalls 44 extending radially outwardly therefrom. A keyhole floor web 46 extends radially outwardly from the inner radial end of keyhole circle 42 to an outer edge 47 which is spaced radially inwardly from the outer circumferential edge of pad 14 so as to create a radially inwardly extending notch 49. A securing hole 48 is approximately centrally located within keyhole circle 42 and extends perpendicularly therethrough.

Each of the legs 36, 38 of pad 14 also includes a pair of side securing holes 50 which are not provided within keyhole slots, but which are otherwise similar to the holes 48 within the keyhole circles 42.

The number of peripheral slots 40 which may be provided in pad 14 can be varied without detracting from the invention. However, it is preferable that three such slots 40 be provided adjacent the forward leading edge of the pad 14, and that two such slots 40 be provided adjacent the trailing edges 39 of the pad 14.

Attached within each of the slots is a gliding clip, 52. Clip 52 is preferably made of a hardened plastic such as NYLON (a registered trademark of DuPont), or other hardened plastic material. The clips should have a coefficient of friction which is substantially less than the coefficient of friction of the pad 14.

Each clip 52 includes an upper flange 54, a lower flange 56, a forward rounded nose 58, and a downwardly-presented gliding surface 60. A pair of registered securing holes or attachment holes 62 is provided in the ends of flanges 54, 56. Also, the flanges 54, 56 terminate in rounded portions which are adapted to register and fit within the keyhole circles 42 of slots 40. The space between flanges 54, 56 will be referred to generally as a web slot 64, and it is shaped to conform and mate with the floor web 46 of slots 40 as illustrated in FIG. 8. In this position, the web 46 is embraced between the upper flange 54 and the lower flange 56 of clip 52 with the securing holes 62 of clip 52 in registered alignment with the securing hole 48 within slot 40.

A button head shoulder bolt 66 includes a shank 70 and a bolt head 68. Shank 70 is inserted through a registered securing holes 62 of clip 52 and also through the securing hole 48 of floor web 46, all as shown in FIG. 8. The axial length of shank 70 is such that it spans the distance between upper flange 54 and lower flange 56 of clip 52. The securing holes 62 of flanges 54, 56 are slightly larger in diameter than the shank 70 so that they are free to flex toward and away from one another while sliding upwardly and downwardly on the shank 70 of bolt 66. Bolt 66 includes an upper threaded end 72 which is threaded within one of the threaded bolt holes 26 of metal shoe plate 12 as shown in FIG. 8. This construction permits the weight of the horse to cause the pad 12 to compress, and also permits the upper and lower flanges 54, 56 of clip 52 to compress toward one another while sliding upon the outer circumferential surface of shank 70 of bolt 66. The axial length of shank 70 permits the bolt 72 to be threaded tightly within the threaded hole 26 so as to secure the pad 12 and the clip 52 to the plate 12.

There are several features of the clip 52 which are important to the invention. As can be seen in FIGS. 8 and 9, the gliding surface 60 of clip 52 protrudes a slight distance below the bottom surface of pad 14. While this distance may vary without detracting from the invention, it is preferred that the surface 60 protrude approximately 1/64 of an inch below the bottom of pad 14. It should also be noted that the nose 58 protrudes a short distance beyond the leading edge of pad 14. While this distance may vary, it is preferred that it protrude approximately 1/32 of an inch from the front of pad 14.

FIGS. 3–5 illustrate the manner in which the clips 52 operate when placed on a horse's hoof. FIG. 3 illustrates the horse's hoof as it is approaching the supporting surface or pavement. The leading edge of the hoof is downwardly presented, and the hoof is moving downwardly and forwardly in the direction indicated by the arrow in FIG. 3.

FIG. 4 illustrates the initial contact between the horse's hoof and the supporting surface. When the supporting surface is soil or natural terrain, the natural movement of the horse's hoof is to continue sliding forwardly a short distance after engagement with the surface. However, with rubber pads, the high coefficient of friction of the rubber causes the horse's hoof to stop more quickly than would normally be the case. The present invention, however, permits the horse's hoof to continue gliding forward due to the fact that the clips 52, and particularly the protruding nose 58 and the protruding gliding surface 60 engage the pavement initially and permit the horse's hoof to continue sliding forwardly.

FIGS. 5 illustrates the position of the horse's hoof after the full weight of the horse has been placed on the hoof. At this point, the weight of the horse causes the rubber floor web between flanges 54, 56 to compress and the flanges 54, 56 of the clip to compress toward one another to a point where the gliding surface 60 no longer protrudes below the bottom surface of the pad 14. This permits the surface of the rubber pad to engage the pavement and provide satisfactory traction for the horse. The clips 40 permit the horse's gait to be normal while at the same time permitting the rubber to provide traction with the pavement after the horse's weight has been placed on its hoof.

The durable characteristics of the plastic from which clips 52 are constructed also add to wear life of the rubber pad 14. The horseshoe assemblies are light, and provide improved traction to the horse while at the same time permitting the horse to retain its normal gait. The use of this present horseshoe assembly can significantly increase the useful life of a draft horse or other horses on hard surfaces.

Pad 14 also includes a plurality of stud receiving holes 100 which extend upwardly in pad 14 from the bottom surface thereof. Referring to FIG. 10, a plurality of studs 102 may each be inserted into one of the holes 100. Each stud 102 includes a head 104, a shank 106 and a nipple end 108. The depth of hole 100 relative to the length of stud 102 is such that the nipple end 108 protrudes outwardly beyond the bottom surface of pad 14 so as to frictionally engage icy or slippery surfaces and enhance traction between the horse's hoof and the icy or slippery surface. The studs 102 are inserted into the holes 100 by forcing them into holes 100 in a manner similar to that used for inserting studs into studded tires.

The means for securing the pad to the bottom of the horse's hoof is significantly better than conventional methods. The ferrule bolts 66 are securely threaded into the metal plates 12, and therefore are tightly secured in place. The metal plates 12 are secured by nails in conventional fashion. This provides a much longer lasting securement of the shoe assembly to the horse's hoof than in situations presently used whereby nails are driven directly through the rubber pad and into the horse's hoof. With prior methods, the compressibility of the rubber pad causes the nails to work loose quickly, and it is difficult to keep the pads on the horse's hoof. The present invention minimizes this problem.

Thus, it can be seen that the device accomplishes at least all of its stated objectives.

We claim:

1. A horseshoe assembly comprising:
    a U-shaped pad member having an upper surface, a lower surface, an exterior edge, an interior edge, a forward closed end, and a rear open end formed from first and second spaced apart legs of said U-shaped pad member, each of said first and second legs having a rear end;
    said pad member being formed from an elastomeric material having a first co-efficient of friction;
    at least one stud receiving hole extending upwardly into said pad member from said lower surface thereof;
    stud means within said at least one stud receiving hole and having upper and lower stud ends, said lower end of said stud means protruding downwardly below said lower surface of said pad member;
    at least a first clip member attached to said pad member, said clip member having a ground engaging surface adjacent said lower surface of said pad member and being formed of a material having a second coefficient of friction which is less than said first coefficient of friction;
    means for attaching said pad member and said clip member to the bottom of a horse's hoof.

2. A horseshoe assembly according to claim 1 wherein said ground engaging surface protrudes downwardly below said lower surface of said pad member.

3. A horseshoe assembly according to claim 2 wherein said means for attaching said pad member and said first clip member to said horse's hoof comprise a second U-shaped member, first securing means attaching said second U-shaped member to said horse's hoof, and second securing means attaching said pad member to said second U-shaped member.

4. A horseshoe assembly according to claim 3 wherein said second securing means also attaches said first clip member to said pad member.

5. A horseshoe assembly according to claim 2 wherein said first clip member is attached to said pad member adjacent said forward closed end of said pad member.

6. A horseshoe assembly according to claim 5 wherein said clip member is compressible in response to said horse placing its weight on said hoof whereby said clip member will compress until said ground engaging surface thereof is in approximately the same plane as said bottom surface of said pad member.

7. A horseshoe assembly according to claim 2 wherein said first clip member is C-shaped and comprises an upper leg, a lower leg and a web extending therebetween, said upper and lower legs embracing said upper and lower surfaces respectively of said pad member, said web of said clip member extending from said upper leg downwardly and forwardly around said exterior edge of said pad member to said lower leg of said clip member.

8. A horseshoe assembly according to claim 2 comprising a plurality of clip members identical to said first clip member, said plurality of clip members and said first clip member being positioned in spaced relation to one another around said exterior edge of said pad member.

9. A horseshoe assembly according to claim 8 wherein a second clip member and a third clip member of said plurality of said clip members are positioned adjacent said rear ends of said first and second legs respectively of said pad member, said first clip member being positioned adjacent said forward closed end of said pad member.

10. A horseshoe assembly according to claim 2 wherein said pad member is comprised of rubber and said first clip member is comprised of plastic.

11. A horseshoe assembly according to claim 10 wherein said rubber of said pad member has a durometer reading of from 50 to 90.

12. A horseshoe assembly according to claim 2 wherein said ground engaging surface of said first clip member protrudes downwardly below said lower surface of said pad member a distance of approximately 1/64 of an inch.

13. A horseshoe assembly according to claim 12 wherein a forward portion of said first clip member protrudes forwardly beyond said forward closed end of said U-shaped pad member.

14. A horseshoe assembly according to claim 13 wherein said forward portion of said first clip protrudes a distance of approximately 1/32 of an inch beyond said forward closed end of said U-shaped pad member.

15. A horseshoe assembly according to claim 1 wherein said stud means comprises an elongated metal member and said lower stud end includes a nipple thereon for frictionally engaging a supporting surface.

16. A horseshoe assembly according to claim 15 wherein said stud means comprises an enlarged stud head at said upper stud end for frictionally retaining said stud means within said at least one stud receiving hole.

* * * * *